United States Patent [19]

Chabrier

[11] Patent Number: 4,514,245
[45] Date of Patent: Apr. 30, 1985

[54] METHOD FOR REINFORCING A HOLLOW BODY MADE BY WINDING A PROFILED SECTION

[75] Inventor: Gilbert Chabrier, Montmorency, France

[73] Assignees: Spie-Batignolles, Puteaux; Coflexip, Paris, both of France

[21] Appl. No.: 380,868

[22] PCT Filed: Sep. 16, 1981

[86] PCT No.: PCT/FR81/00119
§ 371 Date: May 4, 1982
§ 102(e) Date: May 4, 1982

[87] PCT Pub. No.: WO82/01159
PCT Pub. Date: Apr. 15, 1982

[30] Foreign Application Priority Data

Sep. 26, 1980 [FR] France .................. 80 20666

[51] Int. Cl.³ ........................................... B65H 81/08
[52] U.S. Cl. ..................................... 156/161; 29/452;
138/144; 138/153; 138/172; 138/DIG. 2;
138/DIG. 5; 156/162; 156/165; 156/172;
156/187; 220/3
[58] Field of Search ............... 156/425, 428, 429, 195,
156/172, 173, 175, 187, 446, 160–165; 29/452,
458; 138/144, 153, 172, DIG. 2, DIG. 5; 220/3

[56] References Cited

U.S. PATENT DOCUMENTS

| 3,023,495 | 3/1962 | Noland ................... 29/421 |
| 3,099,293 | 7/1963 | Lakritz ................. 156/173 X |
| 3,105,786 | 10/1963 | Anderson ................ 156/173 |
| 3,144,952 | 8/1964 | Uhlig et al. .............. 220/3 |
| 3,184,092 | 5/1965 | George ................... 220/3 |
| 3,207,352 | 9/1965 | Reinhart, Jr. ............. 220/3 |
| 3,240,644 | 3/1966 | Wolff ................... 156/165 |
| 3,446,385 | 5/1969 | Ponemon ................. 220/3 |
| 3,616,070 | 10/1971 | Lemelson ................ 156/446 |
| 3,819,450 | 6/1974 | Kunz .................... 156/425 |
| 3,843,429 | 10/1974 | Jessup ................. 156/172 X |
| 3,969,812 | 7/1976 | Beck ................... 29/421 R |
| 4,010,054 | 3/1977 | Bradt ................... 156/173 |
| 4,113,132 | 9/1978 | Steiner ................. 220/3 X |

Primary Examiner—David Simmons
Attorney, Agent, or Firm—Young & Thompson

[57] ABSTRACT

According to the method of the invention there is wound, around a hollow body (1) and in substantially contiguous turns, a flexible strip (2), the latter strip being fixed onto the hollow body. The strip is of a material, the tensile limit of which is in excess of that of the material of which the hollow body (1) is made, and when wound around the hollow body, a tension is applied thereto which is sufficient for the stresses which may develop within the body and the winding of the strip (2) to reach their permissible maximum limits at substantially the same time, when the hollow body is used under pressure.

5 Claims, 7 Drawing Figures

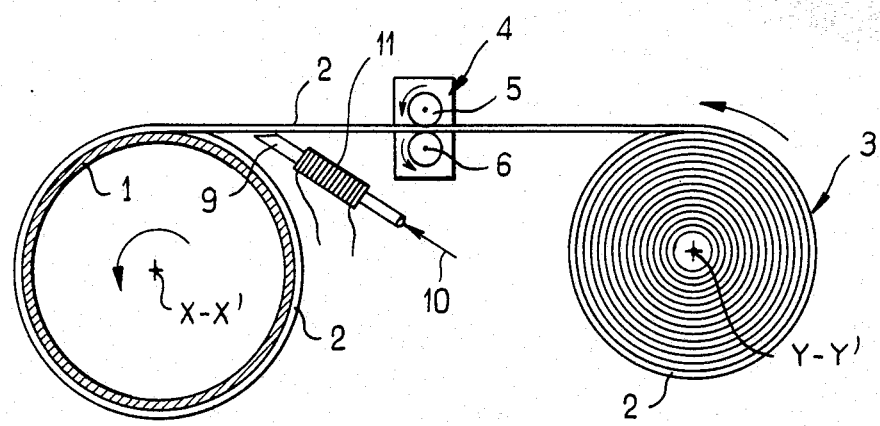
FIG_1
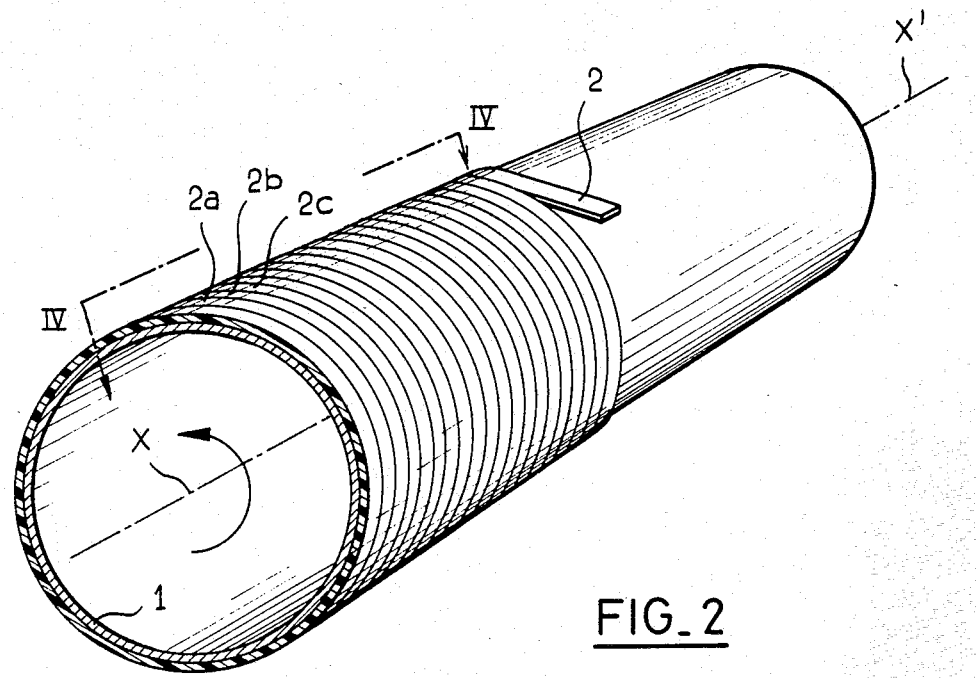
FIG_2

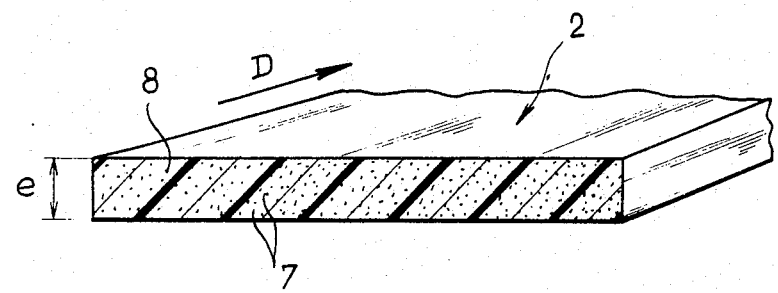
FIG_3
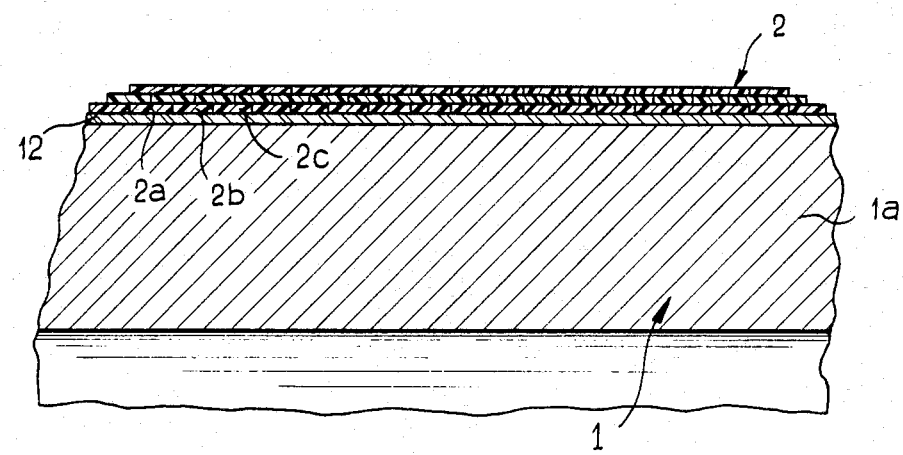
FIG_4
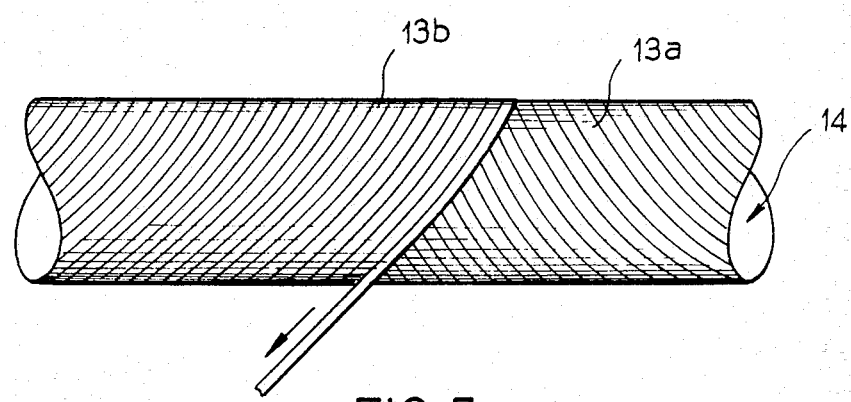
FIG_7

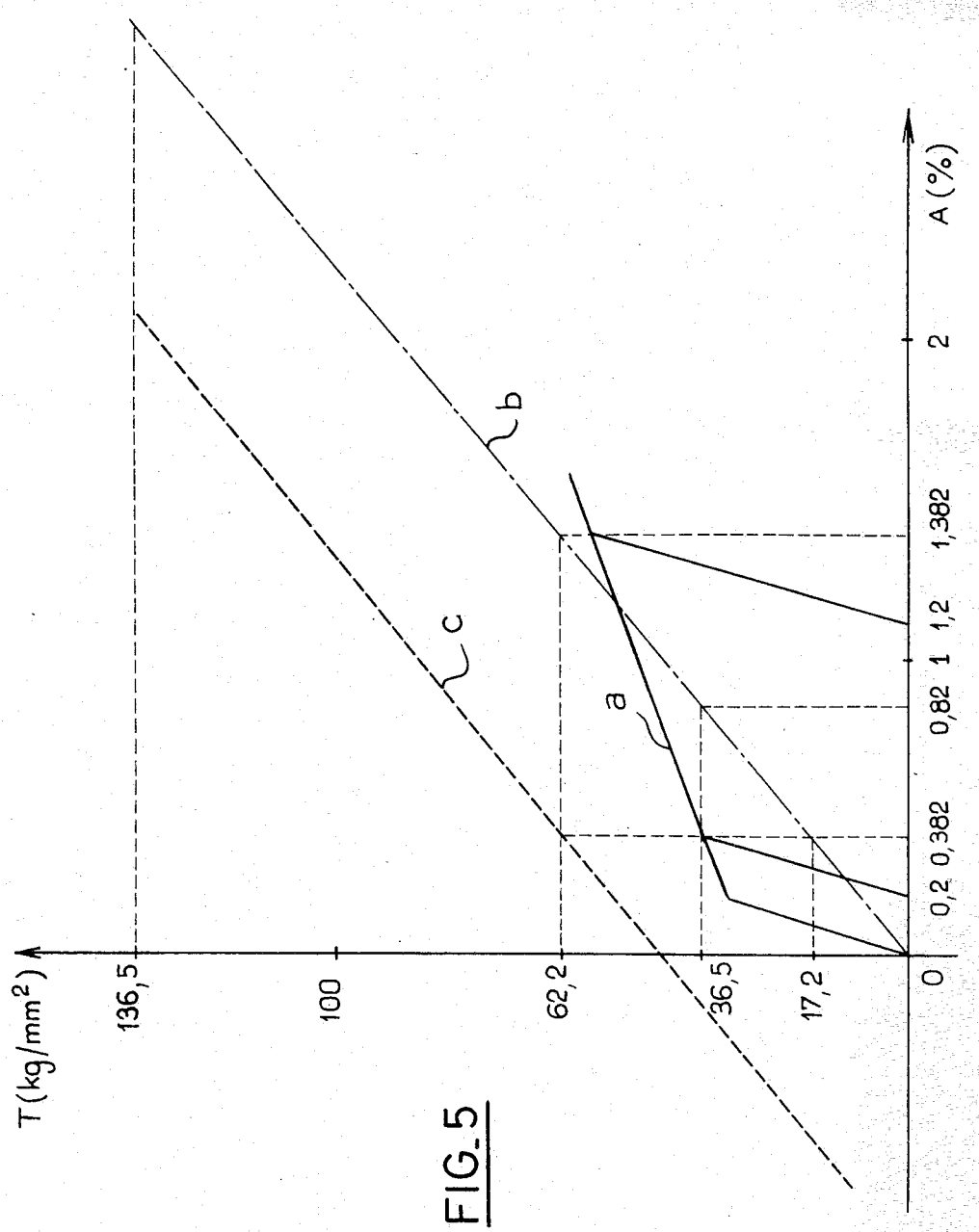
FIG_5

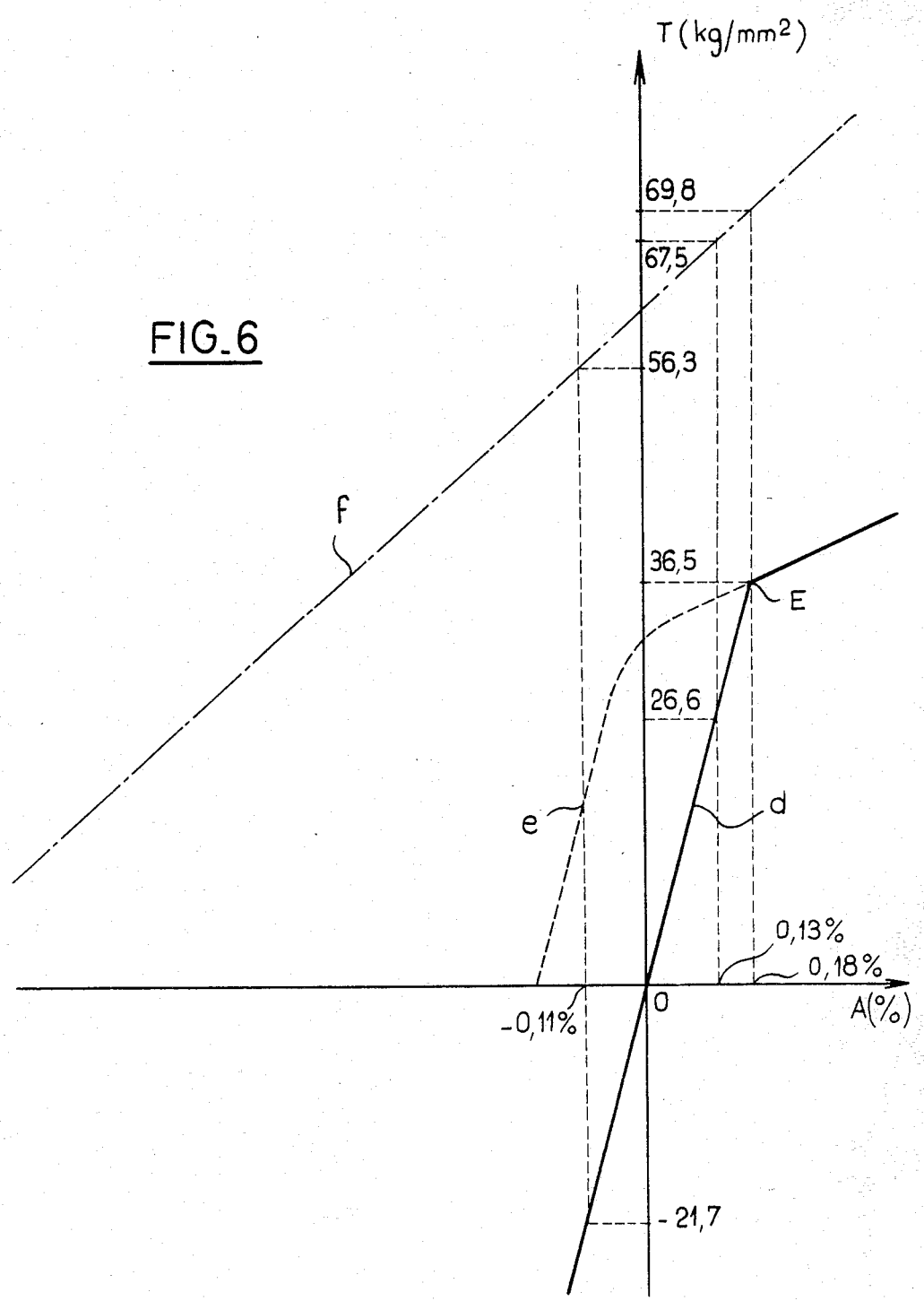

METHOD FOR REINFORCING A HOLLOW BODY MADE BY WINDING A PROFILED SECTION

This invention relates to a method of reinforcing a hollow cylindrical body such as a piping or a container intended to be used under pressure.

Several methods for the external reinforcement of pipings or cylindrical containers, such as steel pipes or containers, are known to the applicant.

According to one of these methods, highly resistant hoops or steel wires are wound onto pipes or containers to be reinforced, with or without applying tension to the hoops or wires.

By applying such wires, the resistance of the pipe or the container against outwardly directed pressures is increased. Pipings or containers reinforced in this manner are however difficult to protect against corrosion as the windings are fixed to the reinforced body only at the ends thereof. glass fibres embedded in a layer of liquid, or a partially polymerised layer of resin are wound onto the piping or container. The complete polymerisation of the resin is then obtained in an oven.

The type of glass fibres known to be used can only be wound with a low tension applied to the glass fibres. Taking into account the difference in tensile modulus between, in the most common case, steel and glass, a significant hydraulic expansion of the reinforced body is required in order to make full use of the resistance of the glass.

The winding of glass fibres embedded in a synthetic resin, however, provides excellent protection against corrosion since fibres are made effectively integral with the body which is reinforced over its entire surface.

The aim of the present invention is to provide a method of reinforcing a hollow cylindrical body whereby the resistance of the hollow body against internal pressure is improved, and which will be easy to perform and which uses the permissible resistance of the fibres to its maximum without any expansion of the reinforced body.

According to the invention there is provided a method of reinforcing a hollow cylindrical body which includes winding onto the hollow body in substantially contiguous spires, a flexible strip and fixing the strip to the hollow body, the strip being of a material having a tensile limit higher than that of the material the hollow body is made of, and being wound onto the hollow body under a tension which is sufficient such that the stresses which may occur in the body and in the windings of the strip reach their permissible maximum limits substantially at the same time, when the body is placed under pressure.

In optimum conditions, the effective resistance of the material of which the strip is made is therefore employed and the expansion of the hollow body which, in practice causes many disadvantages, in in this manner avoided.

According to a preferred arrangement of the method, the strip used is made of fibres embedded in a completely polymerised synthetic resin, said fibres extending in the longitudinal direction of the said strip.

The strip is suitably adapted for the reinforcement of steel pipings or containers. In fact, the said strip of fibres embedded in a completely polymerised resin offers a tensile limit very much higher than that of steel, so that it is possible to wind the said strip onto pipings or containers applying a relatively high tension, significantly less, however, than the permissible stress limit for such a strip.

Furthermore, the fixing of such a strip onto the piping or the container can be carried out very easily, for example, by gluing or thermo-fusion, as long as the resin used is a thermo-plastic resin.

The invention also extends to a strip for the implementation of the method in accordance with the invention.

According to another advantageous embodiment of the invention, the strip may contain at least 50% by volume of mineral fibers embedded in a polymerized synthetic resin. Such a strip has a high tensile strength and allows, at the same time, an external coating to be obtained which insulates the pipe reinforced from the environment.

The invention extends furthermore to a piping reinforced externally on account of a winding applied by means of the above-described strip of the invention and/or by the method of the invention.

According to an advantageous embodiment, this piping may comprise at least one layer of the above-described winding, the said winding being glued onto the said piping and the spires of the said strip being glued to each other.

The spires of the winding may be substantially perpendicular to the axis of the piping, in which case a considerable improvement of the resistance against circumferential stresses is achieved.

In order to improve the resistance of the piping against circumferential and longitudinal stresses, it may be advisable for at least a portion of the spires to be wound obliquely in relation to the axis of revolution of the piping.

Other peculiarities and advantages of the invention will become clearer from the following description with reference to the accompanying drawings.

In the drawings given as non-limiting examples,

FIG. 1 shows diagrammatically the method in accordance with the invention being applied;

FIG. 2 is a three-dimensional view of a portion of a piping, partially covered, externally with a winding obtained from a strip in accordance with the invention;

FIG. 3 is a transverse cross-section, on an enlarged scale, of a strip in accordance with the invention;

FIG. 4 is a partially cross-section view, on an enlarged scale, of the piping of FIG. 2 along line IV—IV of FIG. 2;

FIGS. 5 and 6 show, on charts, stresses occuring within the various material of the piping reinforced in accordance with the invention, in relation to the rate of elongation of the said materials; and FIG. 7 is a side view of an alternative embodiment, of a piping reinforced in accordance with the invention.

Referring to FIGS. 1 and 2, a cylindrical steel piping 1 is shown, intended to contain a fluid under pressure, which is externally reinforced by contiguous spire windings 2a, 2b, 2c, etc., obtained by means of a strip 2 of flexible material.

In the example shown, spires 2a, 2b, 2c, etc., are perpendicular to the axis X—X' of the piping 1.

In accordance with the method of the invention a flexible strip is used which is made of a material, the tensile limit of which is greater than that of the material (e.g. steel) of which the piping 1 is made. The said strip is wound around the said pipe 1, applying a tension sufficient for the stresses, which may develop within the said piping 1 and windings of the said strip 2, to reach their permissible maximums substantially at the same time, when the piping 1 is used under pressure.

In order to carry out this winding, as shown in FIG. 1, the piping 1 is made to rotate around its axis XX', the strip 2 being wound onto the said piping 1 by means of a bobbin 3 also mounted in a rotating manner, on the axis Y—Y', around which the strip 2 is wound in a spiral. The said bobbin 3 is displaceable along the axis Y—Y' and allows the strip 2 to wind onto the piping 1, to form a contiguous spire helix.

The winding tension is adjusted by means of a braking system 4 arranged between the piping 1 and the bobbin 3. The said braking system 4 comprises two rollers 5, 6 between which the strip 2 passes.

The strip 2 which may be particularly used (see FIG. 3) is made of fibres 7 embedded in a synthetic resin 8, said fibres extending in a longitudinal direction D with respect to the said strip.

Said fibres 7 can be mineral fibres such as glass, asbestos, boron and/or carbon fibres. Said fibres 7 can also be of an organic nature and highly resistant such as Kevlar.

The fibres 7 are, however, preferably glass fibres, the latter material being the most economical, both from a point of view of performance and cost.

The strip 2 is, during winding, glued onto the piping as well as onto the underlying layer or layers of winding.

The resin of the strip 2 is preferably a thermoplastic resin such as polyamide or vinyl polychloride. The use of such resins makes it possible to achieve fixing of the flexible section onto the piping 1 and the previous windings by thermo-fusion or thermo-gluing.

In order to carry out the thermo-gluing process it is sufficient to place, under the strip 2, close to the piping 1, a pipe 9 which blows hot air 10 (see FIG. 1) onto the system. The air is heated, for example by means of an electric resistance 11, which is wound around the pipe 9 and heats it. The air is, in this manner, heated sufficiently to ensure the superficial fusion of the resin 8 of the strip 2 and allows, during winding, the strip 2 to be glued onto the piping as well as onto the various spires of the winding.

In order to facilitate gluing, it is advisable to apply, on the external surface of the piping 1, a primary adhesive layer 12 (see FIG. 4). As shown in FIG. 4, it is also advisable for the spires of the winding to be staggered relative to one another in successive layers.

In order to obtain a strip 2 having the desired tensile strength and tensile modulus, the said strip will have to contain at least 50% in volume of mineral fibres. This condition is achieved when the synthetic resin 8 contains at least 70% in weight of glass fibres 7.

Such a strip 2 of fibres embedded in a resin can easily be manufactured by extrusion, impregnation or any other similar process.

It may be seen, more particularly in FIGS. 3 and 4 that the strip 2 has a relatively flat rectangular cross-section.

The fact that the strip 2 has a small thickness e allows the ratio of stresses occuring on account of the radius of curvature in the external fibres 7, as compared to the stresses occuring in the internal fibres, to be limited. The thickness e is preferably determined so that the above ratio is less than 1.2. Under these conditions the stress created in external fibres does not exceed, by more than 20%, the stress created in internal fibres.

The piping 1, reinforced externally by windings in the form of contiguous spires of a strip 2, is capable of being subjected to internal pressures very much higher than those permissible in the absence of windings, as will be explained later, in a more detailed manner.

Furthermore, because the windings of the strip 2 are glued both on the piping 1 and to each other, the coating obtained in this manner is perfectly watertight, so that the piping 1 is, at the same time, efficiently protected against corrosion. The said coating confers at the same time, to the piping 1 a slight thermal insulation which is advantageous if the said piping is intended for the transport of fluids at high or low temperatures.

A specific example of an embodiment of reinforced piping in accordance with the invention is now going to be described in detail.

Characteristics of the piping 1

Steel x52
external diameter: 61 cm
wall thickness: 7.92 mm
tensile limit: 36.5 kg/mm$^2$ Characteristics of the strip nature of the resin: polyamide
nature of the fibres: glass
percentage of fibres: 70% in weight
limit of breaking stress: 136.5 kg/mm$^2$
tensile modulus: 4,500 kg/mm$^2$ In FIG. 5, the curva a represents the tensile modulus of the steel of the piping 1 and the curve b is related to the tensile modulus of the strip 2 in the case the latter is wound with no tension applied, round the steel pipe 1.

It will be noted that, at the tensile limit of the piping 1 (i.e. 36.5 kg/mm$^2$) the elongation A is 0.3825%. Under such conditions the stress induced in the strip 2 is only 17.2 kg/mm$^2$, or hardly 0.126 of its breaking limit which may in fact reach 136.5 kg/mm$^2$. The mechanical properties of the strip 2 are therefore not used to the full if the said section is wound around the piping 1, with no tension being applied.

If on the other hand, during winding of the strip 2 a tension corresponding to an elongation A of 1% of the said strip is applied, the curve c is obtained. In such a case, at the tensile limit of the steel piping 1 a stress in the section 2 equal to 62.2 kg/mm$^2$ is obtained, i.e. only 0.456 of its breaking limit, a figure which is indeed acceptable.

The same result can be achieved if the section 2 is wound and no tension is applied (see curve b) but the piping is allowed to expand. The expansion of the piping 1 however reaches, in these conditions, a value of 1.1% which is clearly in excess of the tensile limit of the steel. There would therefor occur a significant, and unacceptable distortion of the steel used for the piping.

In order to obtain a maximum reinforcement or hooping of the piping 1 by means of a strip 2 of a fibre-resin, the maximum acceptable stresses for the strip and for the steel piping are determined in advance as well as the thickness $e_v$ of the windings of the said strip to be wound around the piping 1, so that the circumferential stress due to internal pressure in the piping is distributed half to the piping and half to the reinforcement and that stresses which may develop in the windings of the strip 2 and in the steel piping 1 reach their acceptable maximum at the same time.

The said thickness $e_v$ is equal to: $(T_a \cdot e_a)/T_v$ a ratio wherein $e_a$ is the thickness of the steel piping 1 and $T_a$ and $T_v$ are the maximum stresses acceptable in the case of the steel and the strip 2 of fibre-resin.

In the case of the preceding example:

$Ta = 0.73 \times 36.5 = 26.6 \text{ kg/mm}^2$ $Tv = 0.5 \times 136.5 = 68.2 \text{ kg/mm}^2$ It follows therefore that $e_v = (26.6/68.2) \times 7.92 =$ about 3 mm.

FIG. 6 shows the stresses occuring in the strip 2 of fibre-resin and in the steel piping 1.

As starting point is considered the expansion of the steel piping 1 (curve d) as having expanded to its tensile limit (E). The curve e given in a dotted line refers to the steel before expansion. The curve f refers to the strip 2 wound, with tension, around the piping 1.

If the internal pressure of the piping 1 is zero, the stresses (winding stress) in the strip 2 is 56.3 kg/mm² and that of the steel (compression is 21.7 kg/mm². The said pre-stress results in a compression of the steel piping of 0.11%.

If the piping 1 is under working pressure, the stress in the steel piping 1 is 26.6 kg/mm², or 0.73 E (E=tensile limit) and the stress in the strip 2 of fibre-resin is 67.5 kg/mm², or about 0.5 R (R=resistance to breaking of the said strip).

Under the abovedescribed conditions the average working rate at the service limit of the system is:

$\frac{26.6 + 67.5}{36.5 + 136.5} = 54\%$ of the average tensile limit of the system, the steel having been subjected to a plastic distortion instead of 73% in the case of steel alone.

At the tensile limit E of the steel, the working rate would only be:

$\frac{36.5 + 69.8}{36.5 + 136.5} = 61\%$ of the average tensile limit of the system instead of 100% in case of steel alone.

Therefore owing to the present invention, it is possible to considerably improve the safety of piping systems intended to be subjected to internal pressures although the service pressure is doubled. Conversely, for a given service pressure, it is possible to use pipings the thickness of which is considerably lower. This results in a considerable saving in weight for the whole of the piping system which may be a saving in the order of 45%.

The invention can apply to the reinforcement of all cylindrical bodies which have to withstand internal pressures.

In the case of windings, the spires of which are substantially perpendicular to the axis of revolution of said bodies, the latter must also, alone, withstand longitudinal stresses, the radial stresses due to the internal pressure being absorbed half by the cylindrical body used as a base and half by the external reinforcement realised by windings of the strip 2 of fibre-resin.

It must be understood that this invention can apply to the reinforcement of pipes or containers made of materials other than steel such as malleable cast-iron, asbestos-cement, ordinary or insulating concrete as well as drilling pipes.

It may be advisable to reinforce the cylindrical body against stresses occuring along the axes of said body. In such a case the winding spires of the strip may be disposed obliquely and may possibly be crossed according to the various successive layers of winding, as in the case of windings made of spires 13a, 13b of the piping 14 shown in FIG. 7.

In a variation of the method, in accordance with the invention, the thermo-gluing process of the section 2 of fibre-resin can be ensured by means of infra-red heating elements arranged in the vicinity of the strip when the latter is wound. Heating can also be ensured by a laser beam or by ultra-sounds.

I claim:

1. A method of reinforcing a cylindrical hollow body (1) intended to contain a fluid under pressure, comprising winding on the hollow body a series of substantially contiguous turns (2a, 2b, 2c) of a flexible strip (2) so as to form on said body at least one layer of said strip, said strip being comprised of fibers (7) embedded in an unfused completely polymerized synthetic resin and extending lengthwise of the strip, applying to the strip during winding a tension, said tension and the thickness of the layer of said strip on said body being such that when the hollow body contains a fluid under pressure the stresses which occur in the body and in the turns of the strip reach their maximum limits at substantially the same time, said tension being obtained solely by said winding and the unfused condition of the resin precluding migration of the fibers radially inwardly through the resin, and fixing continuously said strip on the hollow body and the different turns together.

2. A method according to claim 1, wherein said fibers are selected from the group consisting of glass, asbestos, boron and carbon.

3. A method according to claim 1, wherein said synthetic resin is a thermoplastic resin.

4. A method according to claim 3, wherein the strip is fixed on the hollow body, by heating the surface of said strip to be applied on the hollow body, or on the precedent strip layer, to a temperature sufficient to obtain a superficial melting of the resin of said strip.

5. A cylindrical hollow body produced by the method of claim 1.

* * * * *